(No Model.) 2 Sheets—Sheet 1.

E. A. SPERRY.
ELECTRIC LOCOMOTIVE.

No. 501,195. Patented July 11, 1893.

(No Model.) 2 Sheets—Sheet 2.
E. A. SPERRY.
ELECTRIC LOCOMOTIVE.
No. 501,195. Patented July 11, 1893.
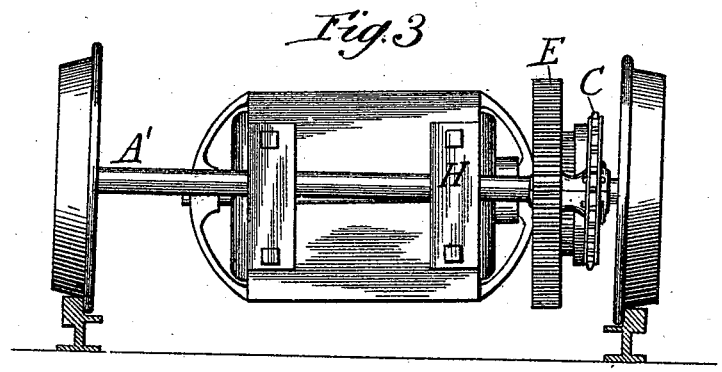
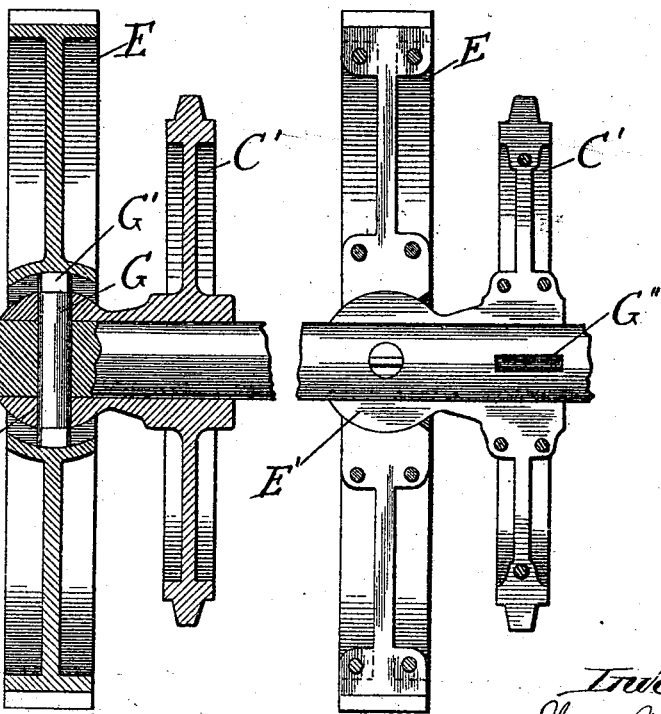
Witnesses:
Inventor:
Elmer A. Sperry.
By Buckingham & Ewart
Attys.

UNITED STATES PATENT OFFICE.

ELMER A. SPERRY, OF CHICAGO, ILLINOIS, ASSIGNOR TO THE SPERRY ELECTRIC RAILWAY COMPANY, OF CLEVELAND, OHIO.

ELECTRIC LOCOMOTIVE.

SPECIFICATION forming part of Letters Patent No. 501,195, dated July 11, 1893.

Application filed April 29, 1892. Serial No. 431,132. (No model.)

*To all whom it may concern:*

Be it known that I, ELMER A. SPERRY, a citizen of the United States, residing at Chicago, in the county of Cook and State of Illinois, have invented a new and useful Improvement in Power-Gearing for Cars, of which the following is a specification.

This invention relates to electric power gearing for cars and has for its object the elastic support of an electric motor upon a car axle, the universal mounting of a gear upon the axle, and other features and details fully set forth in the specification.

Figure 1:
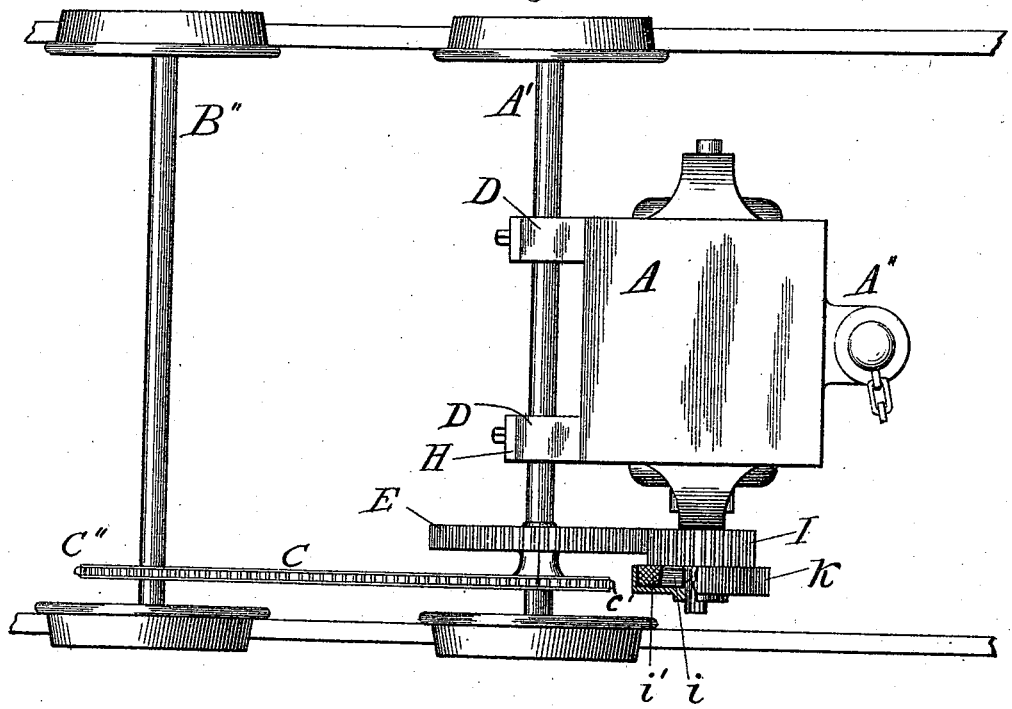
Figure 2:
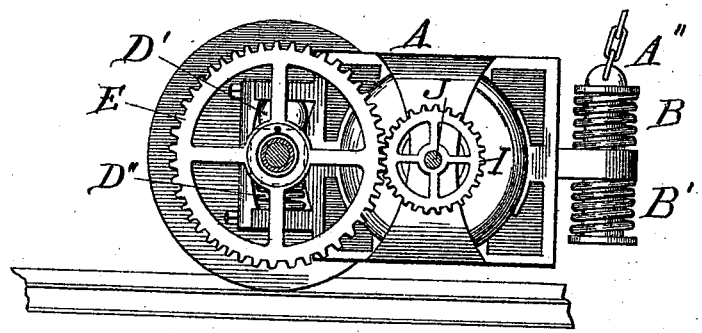

In the accompanying drawings Figure 1 illustrates a plan view of the power gearing; Fig. 2 a side elevation of same; Fig. 3 an elevation from the rear of same. Fig. 4 shows the mounting of the gear and driving pin. Fig. 5 is a detail view. Fig. 6 illustrates an alternate form.

Like letters of reference indicate similar parts throughout the several views.

A is an electric motor of any of the well known types, preferably single reduction, mounted upon the axle A' and supported on the other side at point A'' through an elastic medium consisting of springs B and B'. A second axle B'' is shown as belonging to the truck, which is coupled to the first by a chain drive C which operates upon sprocket C' (see Figs. 4 and 5) and sprocket C'' mounted on axle B''.

In mounting the motor upon the axle I provide slots D similar to my application Serial No. 409,583, which are concentric, or substantially so, with the shaft with which the axle gear meshes.

Boxes are provided for the axle A' supported within the slots by springs D' and D'' (see Fig. 2.) I find that it is not necessary that the slot be of such a form as to carry the center of the axle exactly concentric as stated, inasmuch as the movement is not very great and the gear teeth are of coarse pitch as compared with the amount of such movement. The axle gear E is mounted upon a ball E' which in turn is mounted upon the axle in such a manner as to permit a universal movement between the gear and the ball, but means are provided to prevent the rotation of the gear independently of the ball and may consist of any of the well known constructions employed for this purpose or those shown in former patent Reissue No. 11,177, and application Serial No. 381,551. A pin G is shown with flattened ends G' which may pass through the axle as shown in Fig. 4 or merely through the ball attached to the axle as shown in Fig. 6. Both the gear and ball may be placed upon the axle in halves as shown in Figs. 3, 5 and 6 and formed upon the same casting with the ball may be the sprocket wheel C'. The slots D are provided with removable sides H, Figs. 1 and 3. The pinion I meshing with axle gear E, I prefer to mount loosely upon the shaft J especially if this be the armature shaft, the coupling being made by elastic cushions contained within the flange K, which is secured solidly upon the shaft, similar for instance to my Patent No. 434,096. Wings $i$ are provided upon the pinion and corresponding projections from the flange K, and elastic cushions, a part of one of which is shown at $i'$ are inserted between the projections of the flange and upon each side of the wings $i$ of the loosely mounted pinion serving as the sole drive for such pinion as fully specified and shown in the above named patent.

The use and operation of this invention are as follows: The motor transmits power through the cushion upon its shaft contained within the flange K to the pinion I, thence to the gear E and by means of pin G to the ball E', through the key G'' to the axle A' and by chain C to the axle B'', as will readily be understood. The concentric relation of the slots allows the motor free action upon springs B and B' without allowing the gear E and pinion I to lose their perfect driving relation one with the other. However, should one end of the axle A' (for instance the end to the right Fig. 3) be suddenly raised the inertia of the motor would prevent it from as suddenly being raised. Therefore the axle and motor would assume relations shown in Fig. 3, and were it not that the axle gear E is mounted universally the meshing teeth would be wrenched and probably broken, but the universal mounting mentioned allows the gear to assume a new position of parallelism with reference to the motor irrespective of the position of the axle A' which at all times keeps both gears working exactly on their pitch lines and in a relation which is known to be most favorable to the noiseless operation of spur gearing. The pinion I will be noticed to be of wider face than gear E. This allows of the sliding action of gear E upon the face of pinion I. It will be readily understood that either one could be wider than the other to allow this action which becomes necessary from the fact that lost motion should always exist between the motor and the axle, and furthermore the want of parallelism may take place about some other center along the line of the axle A' than the center of ball G which would require the lateral slipping to a slight extent of the teeth of the gearing.

It will be readily understood that the universal joint can be placed upon axle J and gear E rigidly mounted upon the axle A'. Such a construction would be illustrated by Fig. 4, except that there would be no sprocket wheel C'. In this case, of course, the elastic connection between the pinion and the armature shaft would not be used. However, I prefer the method shown for reason that the pinion I is usually very small and would not be so well adapted to the universal mounting.

What I claim as new, and desire to secure by Letters Patent, is—

1. In a power gearing, an axle, a motor mounted upon the axle, an elastic support between such motor and axle and power transmitting gearing from the motor to the axle consisting in part of a gear wheel mounted on the axle by a universal joint.

2. In a power gearing, an axle, a motor mounted upon the axle by two or more independent journals, an elastic support between each of the journals and the motor and power transmitting gearing from the motor to the axle consisting in part of a gear wheel mounted on the axle by a universal joint.

3. In a power gearing, an axle, a motor mounted upon the axle, an elastic support between such motor and the axle, a toothed gear or pinion upon the motor and a co-operating gear mounted upon the axle by a universal joint.

4. In a power gearing, an axle, a motor mounted upon the axle, an elastic support between such motor and the axle, another elastic support for the motor independent of its support upon such axle, a power transmitting gearing from the motor to the axle consisting in part of a gear wheel mounted on the axle by a universal joint.

5. In a power gearing, an axle, a motor mounted upon the axle, an elastic support between such motor and the axle, an elastically driven pinion mounted upon a shaft upon the motor, in combination with a universally mounted gear upon the axle.

6. In a power gearing, a motor mounted elastically upon an axle, a toothed pinion upon a shaft of the motor, a gear mounted universally upon the axle, and means provided whereby a sliding or lateral movement is permitted between the pinion and the gear.

7. In a power gearing for vehicles, two axles, a motor mounted upon one of the axles, an elastic medium between the motor and the axle, power transmitting gearing from the motor to the axle consisting in part of a universal joint, sprockets mounted upon each axle and driving chain connecting such sprockets.

8. In a power gearing for vehicles, the combination of an axle, a sleeve mounted upon the axle, two wheels mounted upon the sleeve, one by a universal joint connection.

ELMER A. SPERRY.

Witnesses:
HERBERT E. GOODMAN,
W. R. GOODMAN.